Aug. 11, 1925.

H. MASBRUCH

STOP AND TURN SIGNAL FOR AUTOMOBILES

Filed Feb. 28, 1925

1,549,495

Inventor
Henry Masbruch
By
Lester L. Sargent
Attorney

Patented Aug. 11, 1925.

1,549,495

UNITED STATES PATENT OFFICE.

HENRY MASBRUCH, OF PLATTEVILLE, WISCONSIN.

STOP AND TURN SIGNAL FOR AUTOMOBILES.

Application filed February 28, 1925. Serial No. 12,422.

*To all whom it may concern:*

Be it known that I, HENRY MASBRUCH, a citizen of the United States, residing at Platteville, in the county of Grant and State of Wisconsin, have invented a new and useful Stop and Turn Signal for Automobiles, of which the following is a specification.

The object of my invention is to provide a novel stop and turn signal having a hand which may be swung to either of four positions and which is operated by simple and effective mechanism controlled from a point convenient to the driver and by an improved controlling device. I attain these and other objects of my invention by the mechanism illustrated in the accompanying drawings, in which—

Like characters of reference indicate like parts in each of the several views.

Referring to the accompanying drawings, I provide a suitable narrow casing 1, open at the side, and containing a signal, preferably shaped like a human hand swingably mounted at the shank of the signal element on the pivot 3.

Figure 1:
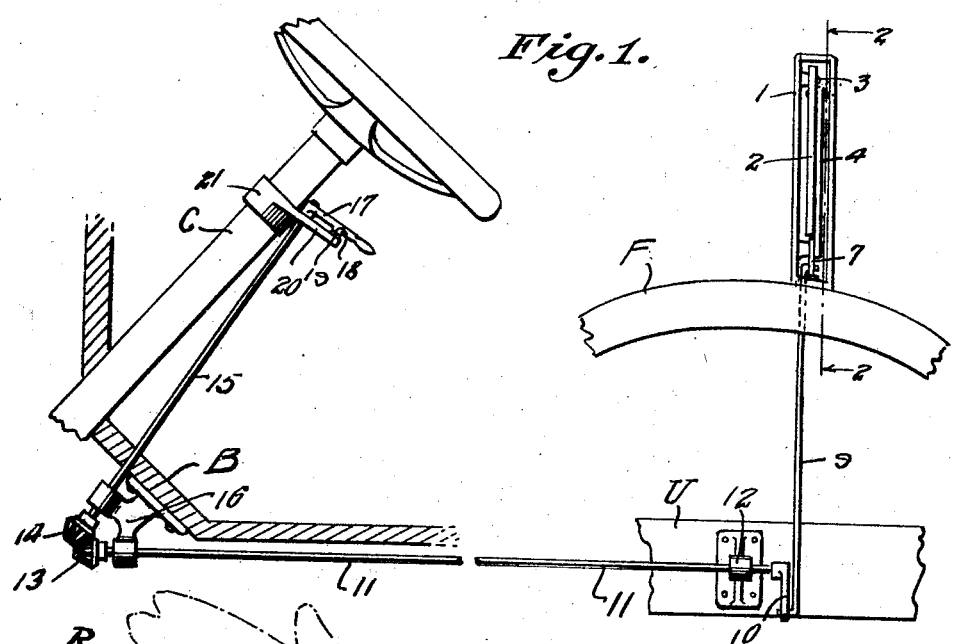
Figure 1 is a side elevation of my invention applied to an automobile.

I provide a signal operating link 4 attached to the hand by the pivot 5 which is spaced from the pivot 3. Link 4 is, in turn, attached to an intermediate point of the lever 7 by pivot 6. Lever 7 is pivotally mounted by pivot 8 on the lower portion of casing 1, at one end of the lever while the other end of this lever is attached to the link or rod 9 which is, in turn, attached to the crank arm 10 of the oscillatable rod 11 which is mounted in suitable bearings 12 and 16. Rod 11 carries a suitable gear, such as bevel gear 13 at its other end which meshes with a corresponding gear 14 on rod 15. I provide a crank arm 17 which functions as an operating handle to operate the signal. Crank arm 17 is provided with a boss 18 on its under side which engages on the notched portion 19 of segment 20, which segment is attached to the steering wheel post C by the ring 21. The casing 1 is bolted on the fender F or any other desired part of the vehicle. The oscillatable rod 11 is mounted on a suitable part of the chassis designated as U in the drawings. The bracket or bearing 16 is affixed to the underside of the footboard B in proximity to the steering post C, as shown in Fig. 1 of the drawings.

Figure 2:
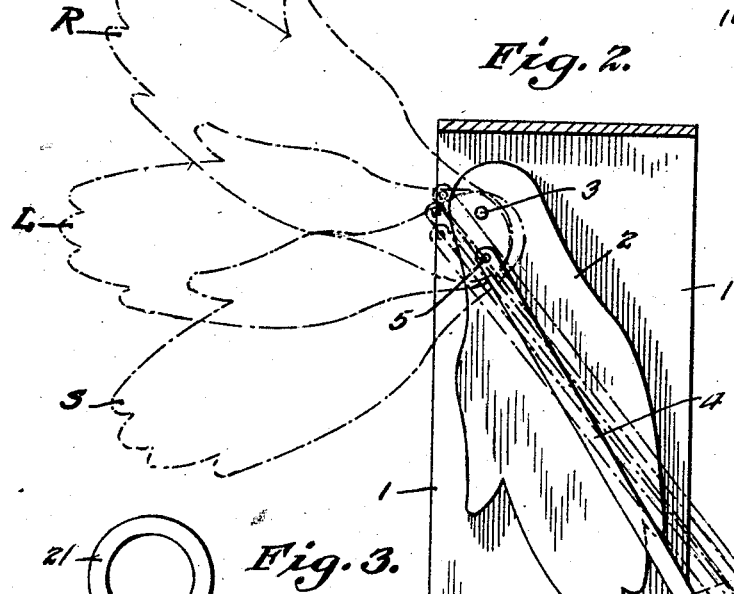
Fig. 2 is a detail sectional view on line 2—2 of Fig. 1.
Figure 3:
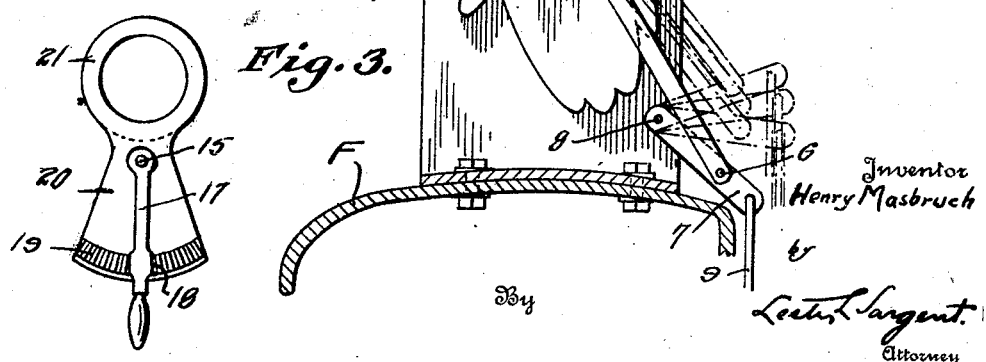
Fig. 3 is a detail top plan view of the controlling lever and segment plate over which it operates.

In operation, the signal is controlled by the handle 17 which when swung to a desired position is held in place by frictional contact with the notched portion 19 of the segment plate 20. The handle is operatively connected with the signaling hand, as shown in Fig. 1, by members 15, 14, 13, 11, 10, 9, 7, and 4. The signaling hand 2 may be swung from a normal position concealed within casing 1 to a downwardly slanting position S, indicated in dotted lines in Fig. 2, to indicate that the automobile is about to stop; or to a horizontal position L, as indicated in dotted lines, to indicate that the automobile is to turn to the right; or to an upwardly slanting position R, as indicated in dotted lines, to indicate that the automobile is to turn to the left. Other movements of the hand are possible if the traffic laws of a particular city are such as to require a different disposition of the hand as an indication of the course which the driver intends to pursue, the signaling hand being readily controllable by the operating lever 17, with which it is mechanically connected and by which it can be positively operated without the interposition of electrical mechanism. Suitable designation marks may be provided on the segment plate 20, if desired, to indicate the position to which operating lever 17 should be moved to operate the signaling hand to a desired position.

It is within the contemplation of my invention to adjust the position of the hand for any desired range of swinging movements and to regulate its position to comply with the requirements of the traffic laws or regulations of communities where it will be used.

The expression "signaling element" as used in the following claims shall be construed to define the operatively suspended hand 2, but the term is not to include levers connected to it.

What I claim is:—

1. In a stop and turn signal for automobiles, the combination of a casing adapted to be attached to a suitable portion of the vehicle, a signaling element pivotally suspended within the casing and swingable to any of a number of exposed positions such as an upwardly slanting position, a horizontal position, or a downwardly slanting position, a link pivotally attached to the signaling element at a point spaced below the point at which the signaling element itself is pivotally mounted, a lever pivotally mounted on the lower portion of the casing and to an intermediate portion of which the said link is connected, means operatively connecting said lever to an operating handle, and an operating handle positioned convenient to the driver of the car.

2. In a stop and turn signal, the combination of a narrow casing open along its edge portion, a signaling element pivotally suspended within the casing and swingable to a variety of exposed positions, a link pivotally attached to the signaling element at a point spaced below the portion of the signaling element pivotally connected to the casing, a lever pivotally mounted to the opposite and lower portions of the casing and to an intermediate portion of which lever the link is pivotally connected, and an operating element connected to the lever.

3. In a stop and turn signal, the combination of a narrow casing open along its edged portion, a signaling element pivotally suspended within the casing and swingable to a variety of exposed positions, a link pivotally attached to the signaling element at a point spaced from the portion of the signal element pivotally connected to the casing, a lever pivotally mounted to the opposite lower portion of the casing and to an intermediate portion of which lever the link is pivotally connected, a link connected to the lever, means for operating said link, said means including an operating handle disposed in a position convenient to the driver.

HENRY MASBRUCH.